(12) United States Patent
Kelly et al.

(10) Patent No.: US 11,996,758 B2
(45) Date of Patent: May 28, 2024

(54) GENERATOR COUPLING SYSTEM

(71) Applicant: SAFRAN ELECTRICAL & POWER, Buckinghamshire (GB)

(72) Inventors: Anthony Kelly, Buckinghamshire (GB); John Nixon, Buckinghamshire (GB)

(73) Assignee: Safran Electrical & Power, Buckinghamshire (GB)

( * ) Notice: Subject to any disclaimer, the term of this patent is extended or adjusted under 35 U.S.C. 154(b) by 0 days.

(21) Appl. No.: 17/910,419

(22) PCT Filed: Mar. 11, 2021

(86) PCT No.: PCT/GB2021/050613
§ 371 (c)(1),
(2) Date: Sep. 9, 2022

(87) PCT Pub. No.: WO2021/181105
PCT Pub. Date: Sep. 16, 2021

(65) Prior Publication Data
US 2023/0137247 A1 May 4, 2023

(30) Foreign Application Priority Data
Mar. 12, 2020 (GB) .................... 2003623

(51) Int. Cl.
*H02K 7/108* (2006.01)
*F01D 15/10* (2006.01)
*H02K 7/18* (2006.01)

(52) U.S. Cl.
CPC ............ *H02K 7/108* (2013.01); *F01D 15/10* (2013.01); *H02K 7/1823* (2013.01)

(58) Field of Classification Search
CPC ...... H02K 7/108; H02K 7/1823; H02K 7/003; F01D 15/10; F16D 2300/06; F16D 11/04;
(Continued)

(56) References Cited

U.S. PATENT DOCUMENTS

| 8,963,391 B2 * | 2/2015 | Grosskopf .............. F16D 11/04 310/78 |
| 2017/0016489 A1 | 1/2017 | Grosskopf et al. |
| 2018/0216678 A1 * | 8/2018 | Legros ..................... F16D 9/00 |

FOREIGN PATENT DOCUMENTS

| EP | 2604878 A2 | 6/2013 |
| FR | 3022294 A1 | 12/2015 |

(Continued)

OTHER PUBLICATIONS

International Search Report and Written Opinion, International Application No. PCT/GB2021/050613 dated May 31, 2021, 13 pages.
(Continued)

*Primary Examiner* — Joseph Ortega
(74) *Attorney, Agent, or Firm* — Rankin, Hill & Clark LLP (57) ABSTRACT

The present invention relates to a generator input shaft assembly comprising a generator input shaft (160) arranged to receive a drive input to the generator, and a disconnect input shaft (120) arranged to deliver a drive input from the generator input shaft to a disconnectable drive transfer means (116). The disconnectable drive transfer means is configured to transfer rotational drive from the generator input shaft assembly to a rotor (110) of the generator. The generator input shaft assembly is configured such that the generator input shaft can: float axially relative to the disconnect input shaft and/or drive the disconnect input shaft with an axis of rotation of the generator input shaft non-parallel to an axis of rotation of the disconnect input shaft, so as to compensate for a misaligned input to the generator input shaft. Other aspects of the invention relate to a generator and a system comprising the generator input shaft assembly.

14 Claims, 5 Drawing Sheets

(58) Field of Classification Search
CPC ...... F16D 2001/103; F16D 3/06; F16D 3/185; F16D 9/00; F16D 11/14; F02C 7/32
See application file for complete search history.

(56) References Cited

FOREIGN PATENT DOCUMENTS

| | | | | |
|---|---|---|---|---|
| GB | 2570657 | A | 8/2019 | |
| GB | 2571104 | A | 8/2019 | |
| GB | 2572427 | A * | 10/2019 | ............. B64D 41/00 |
| JP | 2002-054651 | A | 2/2002 | |

OTHER PUBLICATIONS

Great Britain Search Report, Application No. GB2003623.2, dated Aug. 20, 2020, 4 pages.
European Examination Report corresponding to EP Application No. 21713088.9 dated May 10, 2023, 5 pages.

* cited by examiner

GENERATOR COUPLING SYSTEM

TECHNICAL FIELD

The invention relates to a disconnect device for disconnecting a rotational drive of an aircraft engine from a generator driven by the aircraft engine.

BACKGROUND OF THE INVENTION

Aircraft engines, such as jet or turbojet engines, can be used to drive electrical generators which generate electricity used by the aircraft during operation. Typically, the electrical generators are driven by a drive shaft which is connected, directly or indirectly (e.g. via a gearbox), to a main turbine of an aircraft engine.

As with any mechanical system, mechanical failures can happen in the electrical generators of aircraft engines. A disconnect device which can mechanically decouple the electrical generator from the engine's turbine must therefore be provided. Even though the loss of electrical generation capacity through disconnection can be serious, if a malfunctioning generator is not disconnected from the turbine, the aircraft engine as a whole may be damaged or its performance hindered.

The majority of prior art disconnect devices used in this context provide a means by which an axial force can be applied to the drive shaft, causing the drive shaft to move axially which in turn enables a decoupling mechanism to operate. Known methods exist for providing this axial force in the prior art, each of which has its own disadvantages. These three known methods are:

1. Extracting mechanical power from the rotating drive shaft to operate a disconnect mechanism. Whilst this enables very high actuating forces and rapid disconnection, the known disconnect mechanisms of this kind typically require very accurate tolerances and thus a selective assembly process and so often prove unreliable in the event of a rotor bearing failure with loss of radial location. Therefore, this method has proved to be less reliable in use than would be preferred to date;
2. Using a large actuator and a mechanical advantage generating mechanism such as a lever arm, or using an actuator to release a large and powerful spring. These methods typically have a more robust assembly process and thus prove to be more reliable in service. However, the axial force they can produce is typically limited and will not always be sufficient to guarantee disconnection. Therefore, this method cannot ensure a successful disconnect in all likely failure scenarios;
3. Using hydraulic pressure from the oil cooling system of an aircraft engine to provide the axial force required for disconnection. Whilst this solution can provide very high disconnecting forces, this method does not work in the event of a failure in the oil cooling system. Therefore, this method also cannot ensure disconnect in all likely failure scenarios.

US 2017/0016489 A1 discloses a disconnect mechanism that includes an input shaft defining a drive axis. A disconnect shaft is selectably engaged with the input shaft and driven about the drive axis by the input shaft. When a pawl actuator is translated to engage a ramp, the disconnect ramp shaft axially moves the disconnect shaft from a first axial position to a second axial position.

There exists a need for an improved disconnect device.

SUMMARY OF THE INVENTION

The inventors have identified that improvements can be made to known disconnect devices. These improvements may be best understood with reference to a known disconnect device in which an output from the aircraft engine drives a generator input shaft which is selectably engageable, via a disconnectable drive transfer means, with a disconnect shaft to transfer drive to a rotor of a generator.

The inventors have identified several issues with this known system. One issue arises from misalignment between the generator input shaft and the engine output shaft. Such misalignment causes accelerated wear of the drive transfer means which, in addition to decreasing its service life, can impede the movement of the drive transfer means into its disconnected configuration, making the disconnect device less reliable. Furthermore, the inventors have identified that a lack of lubrication of the drive transfer means can further accelerate wear thereof. The invention seeks to address these drawbacks.

According to the invention, there is provided a generator input shaft assembly, of a generator arranged to be driven by a prime mover of an aircraft, the generator input shaft assembly comprising:
- a generator input shaft arranged to receive a drive input to the generator; and
- a disconnect input shaft arranged to deliver a drive input from the generator input shaft to a disconnectable drive transfer means, the disconnectable drive transfer means being configured to transfer rotational drive from the generator input shaft assembly to a rotor of the generator;
- wherein the generator input shaft assembly is configured such that the generator input shaft can: float axially relative to the disconnect input shaft; and/or drive the disconnect input shaft with an axis of rotation of the generator input shaft non-parallel to an axis of rotation of the disconnect input shaft, so as to compensate for a misaligned input to the generator input shaft.

The invention provides a solution to the issues identified in known disconnect devices. In particular, the disconnectable drive transfer means does not suffer accelerated wear should there be a misaligned input to the generator input shaft. Instead, misalignment is compensated by the generator input shaft assembly having a generator input shaft that is able to transfer drive even when its axis of rotation is non-parallel to that of the disconnect input shaft. Furthermore, the generator input shaft being able to float axially relative to the disconnect input shaft allows it to transfer drive when there is misalignment as a result of the disconnect input shaft's position along the axis of the rotor.

The generator input shaft may be configured to drive the disconnect input shaft via an axially moveable torque transferring interface. The axially moveable torque transferring interface may comprise intermeshing input teeth. The intermeshing input teeth project radially with respect to the disconnect input shaft. The intermeshing input teeth may comprise a first set of teeth extending from an inner circumferential surface of the disconnect input shaft. The first set of teeth may be arranged to intermesh with a second set of teeth. The second set of teeth may extend from an outer circumferential surface of the generator input shaft. The axially moveable torque transferring interface may comprise a spline arrangement.

According to another aspect of the invention, there is provided a generator arranged to be driven by an aircraft engine, comprising the generator input shaft assembly as described hereinabove. The generator may further comprise a fluid circuit configured to deliver a flow of fluid to the axially moveable torque transferring interface. This has the advantage of providing a generator in which the axially moveable torque transferring interface may be sufficiently lubricated to increase its wear resistance to thereby increase its service life and improve the reliability of the disconnect device.

The fluid circuit may be configured to deliver a flow of fluid to the disconnectable drive transfer means. The disconnectable drive transfer means may comprise a first disconnect member and a second disconnect member, and an engaging interface therebetween. The fluid circuit may be configured to deliver a flow of fluid to the engaging interface. This has the advantage of providing a generator in which the disconnectable drive transfer means may be sufficiently lubricated to increase its wear resistance to thereby increase its service life. In particular, this has the advantage of increasing the reliability of the disconnect device, especially when operated at high speeds, and of increasing the durability of the disconnect device to allow for a greater number of disconnections before servicing is required.

The first disconnect member may be configured to transfer rotational drive to the rotor via an intermeshing rotor interface. The fluid circuit may be configured to deliver a flow of fluid to the intermeshing rotor interface. This has the advantage of providing a generator in which the intermeshing rotor interface may be sufficiently lubricated to increase its wear resistance to thereby increase its service life and improve the reliability of the disconnect device.

The rotor may be mounted in a generator housing. The rotor may be journaled by a rotor bearing. The fluid circuit may be configured to deliver a flow of fluid to the rotor bearing. This has the advantage of providing a generator in which the rotor bearing may be sufficiently lubricated to increase its wear resistance to thereby increase its service life and improve the reliability of the generator.

The fluid circuit may comprise a first branch, configured to deliver a flow of fluid to the axially moveable torque transferring interface between the generator input shaft and the disconnect input shaft. The first branch may be configured to deliver a flow of fluid to the disconnectable drive transfer means. The fluid circuit may comprise a second branch. The second branch may be configured to deliver a flow of fluid to the rotor bearing. This has the advantage of substantially separating the fluid circuits into two branches such that a blockage or loss of pressure in one branch will have a reduced negative effect on the other branch. Therefore, this provides the advantage of a more reliable disconnect device that is able to continue providing fluid for lubrication to the axially moveable torque transferring interface and to the disconnectable drive transfer means even in a situation of failure of the rotor bearing. Furthermore, this provides the advantage that components will retain their wear resistance even in some situations of failure.

According to another aspect of the present invention, there is provided a system comprising the generator as described hereinabove. The system may further comprise an aircraft engine assembly comprising an engine assembly output shaft. The generator may be arranged to be driven by the engine assembly output shaft. The generator input shaft may be configured to be able to float axially relative to the disconnect input shaft and/or to be able to drive the disconnect input shaft when an axis of rotation of the generator input shaft is non-parallel to an axis of rotation of the disconnect input shaft so as to be able to compensate for a misalignment between the engine output shaft and the disconnect input shaft of the generator.

The generator input shaft may comprise a distal end facing the aircraft engine and a generator end facing the rotor. The generator input shaft may be configured such that a force generated by a pressure of the fluid circuit of the generator impinging on the generator end is equal to a force generated by a pressure of an engine assembly fluid impinging on the distal end. This has the advantage that the pressure of the fluid circuit from the generator is balanced by the pressure of fluid impinging on the distal end of the generator input shaft, such that the resultant force on the generator input shaft along its axis may be zero. This has the advantage of providing a system in which the generator input shaft does not suffer from a high axial load due to the hydrostatic pressure of the fluid. Therefore, premature wear and damage to the generator input shaft assembly is reduced.

BRIEF DESCRIPTION OF THE DRAWINGS

Further features and advantages of the present invention will become apparent from the following description of embodiments thereof, presented by way of example only, and by reference to the drawings, wherein.

DETAILED DESCRIPTION

Figure 1:
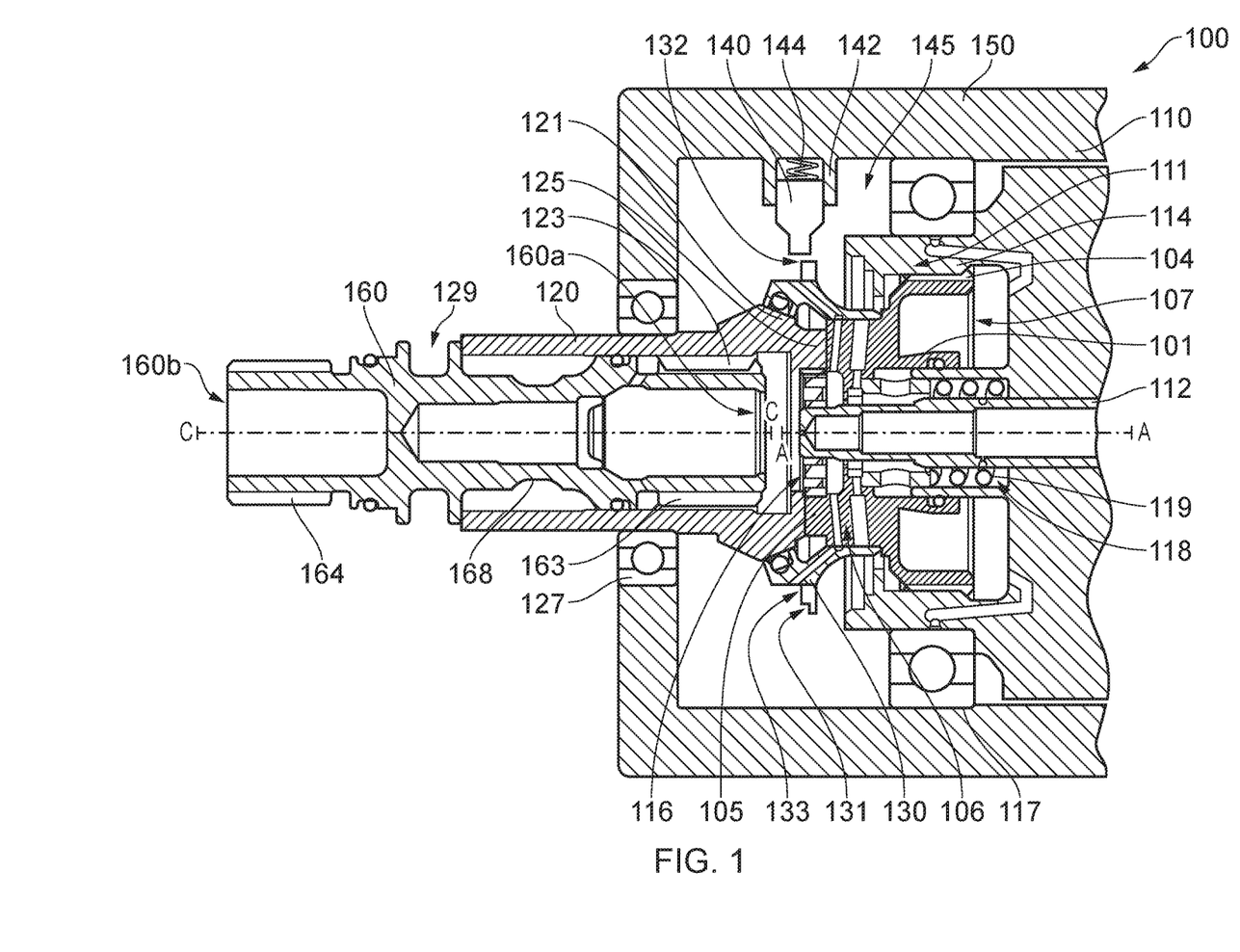
FIG. 1 is a schematic diagram illustrating a disconnect device according to one embodiment of the present invention.
Figure 5:
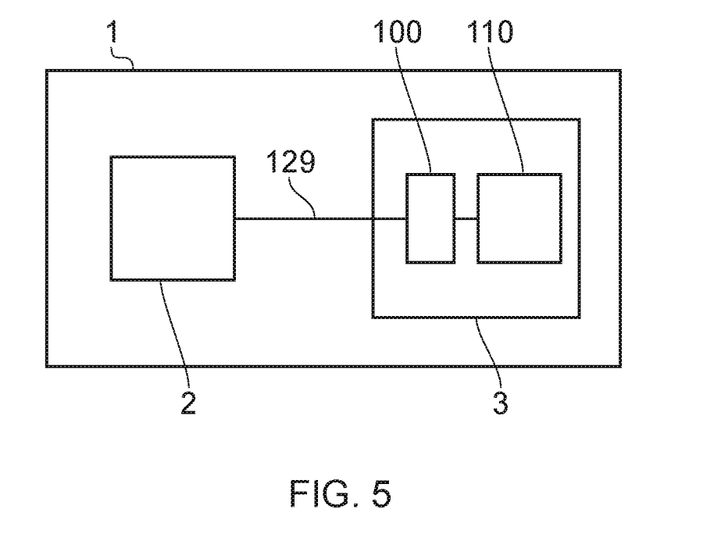
FIG. 5 is a schematic diagram illustrating an aircraft and an aircraft engine according to embodiments of the present invention.

Turning to FIGS. 1 and 5, there is shown a generator input shaft assembly 129 according to one embodiment. The generator input shaft assembly 129 is shown and described herein in the context of a generator drive disconnect device 100. The generator drive disconnect device 100 can be comprised in a generator 3, arranged to be driven by a prime mover of an aircraft such as an aircraft engine 2, of an aircraft 1. The generator 3 comprises a rotor 110, rotatable about a rotor axis A. The generator 3 further comprises a disconnect input shaft 120, rotatable about the rotor axis A. The generator input shaft assembly 129 transfers drive from the aircraft engine 2 to the disconnect device 100. The drive from the engine may optionally be provided via an output gearbox, preferably via an output shaft, of the aircraft engine. A system can therefore comprise an aircraft engine assembly, comprising a prime mover and an output shaft, and a generator input shaft assembly 129.

FIG. 1 illustrates one embodiment of the disconnect device 100. A disconnect input shaft 120 is rotatably mounted in a generator housing 150, journaled to rotate about rotor axis A by a bearing 127. A generator input shaft 160 is mounted within the disconnect input shaft 120 by a set of intermeshing splines 123, 163. The disconnect input shaft 120 and the generator input shaft 160 are together comprised in an input shaft assembly 129. In operation, an aircraft engine can be connected to the input shaft assembly via splines 164 provided on the generator input shaft 160. In this way, the input shaft assembly 129 transfers rotational drive from the aircraft engine to drive the disconnect device 100 to rotate about rotor axis A. The rotor 110 of the generator is rotatably mounted in the housing 150, journaled by a rotor bearing 117. The rotor comprises splines 114 arranged to mesh with splines 104 of a first disconnect member 101. Therefore, the first disconnect member 101 is able to rotate with the rotor 110 via meshed splines 104, 114 and can move along rotor axis A relative to the rotor 110. The disconnect device 100 comprises a disconnectable drive transfer means 116 arranged to transfer rotational drive between the first disconnect member 101 and a second disconnect member 121. The second disconnect member 121 is arranged to rotate with the disconnect input shaft 120. Although the second disconnect member 121 is shown in FIG. 1 to be an integral part of the disconnect input shaft 120, it will be appreciated that this component may instead be distinct from the disconnect input shaft 120 while still being able to rotate therewith. The first and second disconnect members 101, 121 comprise first and second clutch members 105, 125, respectively, that are axially separable from one another. When engaged, the clutch members 105, 125 facilitate the transfer of rotational drive in the drive transfer means 116 such that the drive transfer means 116 is in a connected configuration. In the connected configuration, the drive transfer means 116 transfers rotational drive from the disconnect input shaft 120 to the rotor 110, via the first and second disconnect members 101, 121. When the clutch members 105, 125 are axially separated by the relative axial separation of the first and second disconnect members 101, 121, the drive transfer means is in a disconnected configuration. Such separation may be achieved by any suitable disconnect mechanism. For example, a ramp member 130 may be provided, able to rotate with the drive transfer means 116 and comprising a ramp 131. A disconnect actuating member 140 may be mounted to the housing 150 and can be actuated towards the rotor axis A, that is, towards the ramp member 130. After actuation of the disconnect actuating member 140, it engages the ramp 131 to axially move the first disconnect member 101 away from the second disconnect member 121 to thereby move the drive transfer means 116 to its disconnected configuration.

The clutch members 105, 125 are together configured as a dog clutch and are axially separable along rotor axis A, but it will be appreciated that other suitable forms of drive transfer means, such as a friction clutch, may be employed. The first disconnect member 101 is moveable along rotor axis A between a first axial position and a second axial position. In the first axial position of the first disconnect member 101, the first clutch member 105 is engaged with the second clutch member 125 such that the drive transfer means 116 is in its connected configuration. In the second axial position of the first disconnect member 101, the first clutch member 105 is disengaged from the second clutch member 125 such that the drive transfer means 116 is in its disconnected configuration. In FIG. 1, the first disconnect member 101 is shown to be positioned in its first axial position such that the drive transfer means 116 is in its connected configuration. In the connected configuration of the drive transfer means 116, the clutch members 105, 125 cause the first disconnect member 101 and the second disconnect member 121 to rotate together at the same speed. In the disconnected configuration of the drive transfer means 116, the clutch members 105, 125 are separated along rotor axis A such that the first disconnect member 101 and the second disconnect member 121 rotate independently of each another.

In the arrangement shown in FIG. 1, the second disconnect member 121 is not moveable along the rotor axis A relative to the disconnect input shaft 120. In another arrangement, the second disconnect member 121 may be an independent component to the disconnect input shaft 120 and may be configured to rotate therewith by, for example, a set of meshing teeth. In a further arrangement, the second disconnect member 121 is an independent component to the disconnect input shaft 120 and can, for example by the provision of meshing splines, move along the rotor axis A relative to the disconnect input shaft 120. Therefore, while the figures referenced herein illustrate an embodiment in which only the first disconnect member 101 is moveable along rotor axis A, it will be understood that modifications to this arrangement could be made such that the second disconnect member 121 were also, or solely, able to move along rotor axis A, in order to move the drive transfer means 116 into and out of the disconnected configuration.

The rotor 110 is rotatable within the housing 150, journaled by a bearing 117. The rotor 110 comprises a plurality of splines 114 on an inner circumferential surface thereof. These may be provided on a flange 111. The first disconnect member 101 comprises a plurality of splines 104 disposed around an outer circumferential surface of a second end 107 of the first disconnect member 101. The splines 104 engage the splines 114 such that rotational drive can be transferred between the first disconnect member 101 and the rotor 110. The splines 104, 114 allow the first disconnect member 101 to translate along the rotor axis A between the first axial position and the second axial position. Therefore, the first disconnect member 101 can rotate with the rotor 110, relative to the housing 150, while being axially moveable relative to the rotor 101. In the connected configuration, rotational drive is transferred from the disconnect input shaft 120 to the rotor 110 via the drive transfer means 116 and the splines 104, 114. The rotor 110 further comprises a rotor shaft 112, fixedly mounted to the rotor 110. The rotor shaft 112 extends axially from the rotor 110 along the rotor axis A towards the drive transfer means 116.

The disconnect device 100 may further comprise a biasing means 119. The biasing means 119 can be arranged to bias the drive transfer means 116 to its connected configuration. In FIG. 1, the biasing means is shown to be a coiled spring disposed around the rotor shaft 112 in an annular space 118 around rotor axis A, but it will be understood that other suitable biasing means may be employed instead of, or in addition to, a spring. The biasing means 119 is arranged to be in compression such that it exerts a force to bias the first disconnect member 101 away from the rotor 110. Therefore, the biasing means 119 biases the first disconnect member 101 towards the second disconnect member 121, thereby biasing the first clutch member 105 towards engagement with the second clutch member 125, to thereby bias the drive transfer means 116 to its connected configuration. As such, the biasing means 119 is a connection biasing means.

The disconnect device 100 further comprises a disconnect mechanism. The disconnect mechanism comprises any suitable mechanism capable of moving the drive transfer means 116 into the disconnected configuration. Such separation may be achieved by moving the first disconnect member 101 axially relative to the second disconnect member 121.

The figures described herein refer to one possible example of a known disconnect mechanism that may be employed in the disconnect device 100. In this example, the ramp member 130 is disposed around an outer circumferential surface of the first end 106 of the first disconnect member 101. The ramp member comprises a ramp 131 extending around at least a part of the angular extent of the ramp member 130. The ramp member 130 comprises an inner flat section 133 that comprises an annular surface disposed around rotor axis A, extending around the full angular extent of the first disconnect member 101. The ramp member 130 further comprises an outer flat section 132, disposed at least part way around the rotor axis A, that is, extending around at least a part of the angular extent of the first disconnect member 101. The ramp 131 and the outer flat section 132 are disposed radially outwards of the inner flat section 133. The outer flat section 132 is axially offset, along the rotor axis A, from the inner flat section 133. In this embodiment, the outer flat section 132 is offset from the inner flat section 133 towards the flange 111, but it will be understood by the skilled person that a different arrangement may be employed in different embodiments, such as in an embodiment in which the ramp member is instead disposed around the second disconnect member 121. The ramp 131 of the ramp member 130 begins at an axial position of the outer flat section 132 and ramps in a helical manner towards the axial position of the inner flat section 133, that is, towards the disconnect input shaft 120 in this embodiment. Therefore, the ramp 131 provides a substantially axially-oriented incline extending from the axial position of the outer flat section 132 towards the axial position of the inner flat section 133.

The disconnect mechanism of this example further comprises a disconnect actuating member 140 within an actuation chamber 145 of the housing 150. In FIG. 1, the disconnect actuating member 140 is shown to have a cylindrical portion slideably receivable by an extension 142 of the housing 150, but it will be appreciated that other suitable means for mounting the disconnect actuating member 140 to the housing may be employed. Furthermore, while the disconnect actuating member is shown in FIG. 1 to have an axis of motion perpendicular to the rotor axis A, it will be appreciated that the disconnect actuating member 140 may instead be oblique to the rotor axis A. The disconnect actuating member 140 is moveable between a de-activated position and an activated position. A spring 144 is provided between the disconnect actuating member 140 and the housing 150, but it will be appreciated that other suitable biasing means may be employed. The spring 144 biases the disconnect actuating member 140 towards its activated position, that is, towards the rotor axis A in a direction that may be perpendicular to the rotor axis A. In FIG. 1, the disconnect actuating member 140 is in its de-activated position. The disconnect actuating member 140 is maintained in its de-activated position, against the force of the spring 144, by a retaining means (not shown). It will be understood by the skilled person that any such retaining means capable of enabling the disconnect actuating means 140 to be spring-loaded will be suitable. The retaining means may comprise a mechanical latching mechanism, or any suitable pneumatic, hydraulic or magnetic mechanism capable of holding the disconnect actuating member 140 in its de-activated position, against the force of the spring 144. It will be understood by the skilled person that upon releasing the retaining mechanism, the disconnect actuating member 140 will be forced, by the spring 144, towards the rotor axis A into an activated position, in which it can activate the disconnect mechanism. Alternatively, the biasing and retaining means may be replaced or supplemented by an active actuation means (not shown), capable of moving the disconnect actuating member 140 between its de-activated and activated positions. Such an active actuation means may comprise a solenoid, hydraulic or pneumatic arrangement, or any other arrangement capable of actuating the disconnect actuating member 140 towards the ramp member 131 and further towards the rotor axis A.

In the de-activated position, the disconnect actuating member 140 of the disconnect mechanism of this example is positioned in proximity to, and radially outward of, the ramp member 130, but not in contact therewith. Movement of the disconnect actuating member 140 into the activated position, that is, towards the rotor axis A, allows it to engage the ramp member 130. When the disconnect actuating member 140 engages the ramp 131 on the ramp member 130, the interaction between the disconnect actuating member 140 and the ramp 131 forces the ramp member 130 along rotor axis A to move the first disconnect member 101 from its first axial position to its second axial position, thereby moving the drive transfer means 116 into its disconnected configuration.

As shown in FIG. 1, the disconnect actuating member 140 is in its de-activated position. The first disconnect member 101 is held in its first axial position by the biasing means 119. Therefore, the drive transfer means 116 is in its connected configuration such that rotational drive is transferred from the disconnect input shaft 120 via the drive transfer means 116 to the first disconnect member 101 and to the rotor 110. As such, the disconnect input shaft 120, first disconnect member 101, ramp member 130 and the rotor 110 rotate together with respect to the disconnect actuating member 140.

Upon release of the retaining mechanism of the disconnect actuating member 140, the disconnect actuating member 140 is biased by the spring 144 towards its activated position, that is, towards the ramp member 130. Depending upon the rotational position of the ramp member 130 when the disconnect actuating member 140 is moved to its activated position, the disconnect actuating member 140 will either contact an outer circumferential surface of the ramp 131 or engage the outer flat section 132. In the former case, the ramp member 130 will rotate with respect to the disconnect actuating member 140 until the outer flat section 132 is brought into rotational alignment with the disconnect actuating member 140, at which point the spring 144 continues to bias the disconnect actuating member 140 towards rotor axis A and into engagement with the outer flat section 132. In any case, the disconnect actuating member 140 will engage the outer flat section 132 within one revolution of the ramp member 130 about rotor axis A.

As the ramp member 130 continues to rotate with respect to the disconnect actuating member 140, so too does the outer flat section 132, until the disconnect actuating member 140 eventually engages the ramp 131. At this point, continued rotation of the ramp member 130 with respect to the disconnect actuating member 140 forces the ramp member 130 in a axial direction to thereby move the first disconnect member 101 from its first axial position to its second axial position, thereby disengaging the drive transfer means 116. Once the ramp member 130 has been forced a sufficient distance along rotor axis A, the continued biasing of the disconnect actuating member 140 towards the rotor axis A allows the disconnect actuating member 140 to move radially inwards towards rotor axis A to thereby bring the disconnect actuating member 140 into engagement with the inner flat section 133. The engagement of the disconnect actuating member 140 with the inner flat section 133 holds the ramp member 130 at an axial position that maintains the first disconnect mechanism 101 at its second axial position, against the action of the biasing means 119.

The generator input shaft assembly 129 comprises the disconnect input shaft 120 and a generator input shaft 160. The generator input shaft 160 is mounted at least partially within the disconnect input shaft 120 and has an axis of rotation about an input axis C. In FIG. 1, the generator input shaft 160 is disposed around rotor axis A; therefore, the input axis C and the rotor axis A are collinear. The generator input shaft 160 comprises splines 163 extending from an outer circumferential surface of a first end 160a of the generator input shaft 160. The disconnect input shaft 120 comprises splines 123 extending from an inner circumferential surface thereof, the splines 123 being arranged to intermesh with the splines 163. This splined connection 123, 163 permits the generator input shaft 160 to transfer rotational drive to the disconnect input shaft 120. Furthermore, the splined connection 123, 163 permits axial movement of the generator input shaft 160 along rotor axis A relative to the disconnect input shaft 120. Although the figures and the description provided herein specify that the disconnect input shaft 120 and the generator input shaft 160 are connected by a splined engagement, it will be understood that any suitable means for transferring drive rotational drive while permitting relative axial movement may be employed, such as an axially moveable torque transferring interface. Furthermore, the splined engagement 123, 163 is arranged such that the generator input shaft 160 can rock about rotor axis A such that input axis C and rotor axis A may become non-parallel. In one embodiment, this is achieved by an arrangement wherein the inner diameter of the disconnect input shaft 120 is sufficiently larger than the largest outer diameter of the splines 163, thereby permitting the splines 163 to rock relative to the splines 123. The splined engagement 123, 163 may comprise crowned splines to further facilitate such freedom of movement of the generator input shaft 160 relative to the disconnect input shaft 120. Therefore, the splined engagement 123, 163 facilitates the transfer of rotational drive between the generator input shaft 160 and the disconnect input shaft 120, even in circumstances in which the generator input shaft 160 is moved axially relative to the disconnect input shaft 120 and/or the generator input shaft 160 is non-parallel to the rotor axis A.

Optionally, the generator input shaft 160 further comprises a shear neck portion 168. As is well known in the art, the shear neck portion 168 comprises a portion of reduced thickness of the shaft. Therefore, should the generator input shaft 160 experience a high shear stress resulting from, for example, a lagging generator rotor and a failed disconnect device, then the generator input shaft 160 will fail at the shear neck portion 168 to reduce adverse effects on the gearbox. The generator input shaft 160 further comprises a plurality of splines 164, provided at a second end 160b of the generator input shaft 160. The splines 164 are shown to be disposed around an outer circumferential surface of the second end 160b of the generator input shaft 160. The splines 164 are provided as a means to connect the generator input shaft 160 to the aircraft engine, as will be described with reference to FIG. 2.

Figure 2:
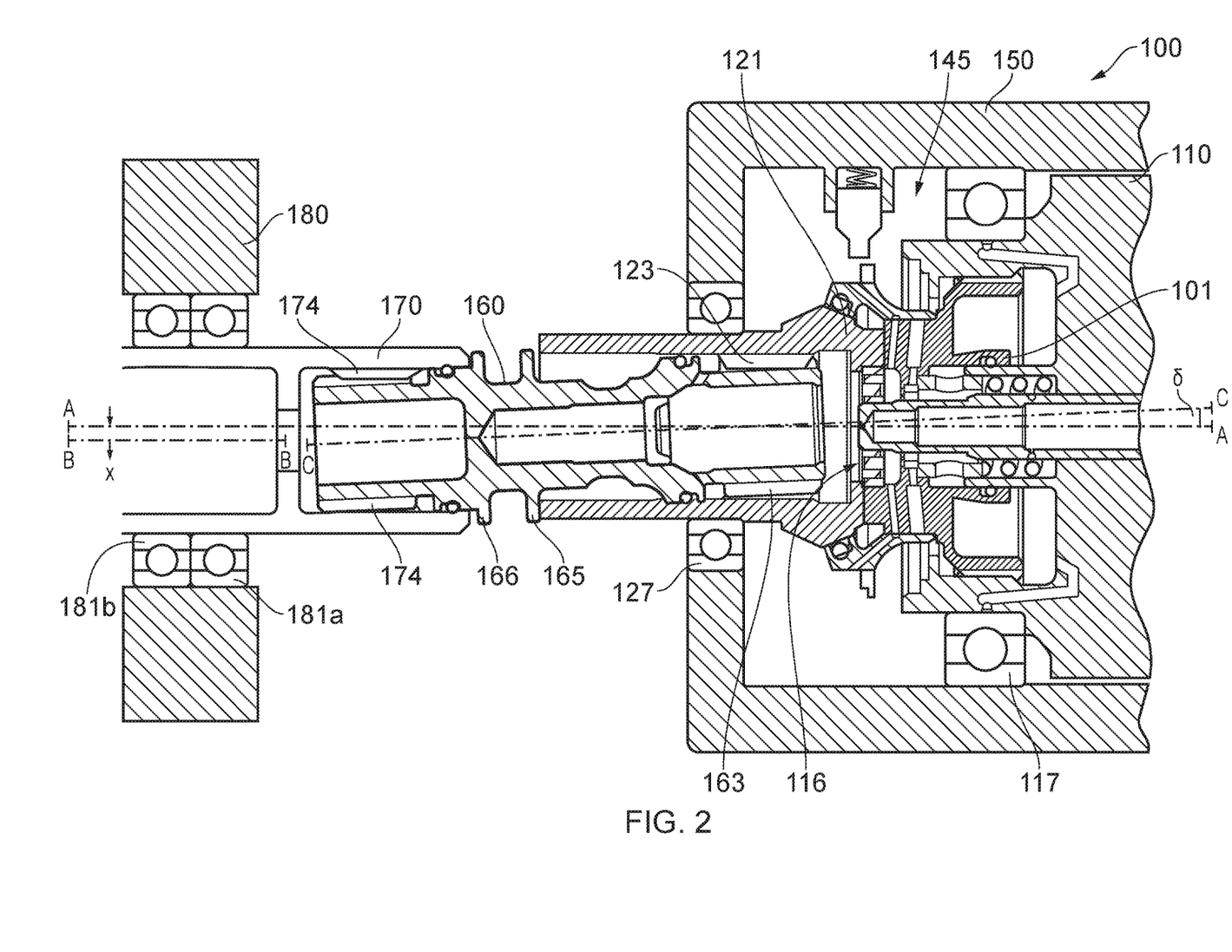
FIG. 2 is a schematic diagram illustrating the disconnect device of FIG. 1.

FIG. 2 illustrates an embodiment of the disconnect device 100 as described hereinabove with reference to FIG. 1. The disconnect device 100 is configured to selectably transfer drive from an aircraft engine, of an aircraft in which the disconnect device 100 is installed, to the rotor 110 of the generator. Rotational drive may be transferred to the disconnect device 100 via an aircraft gearbox (not shown). The aircraft gearbox transfers a rotational drive via an aircraft gearbox output shaft 170. As shown in FIG. 2, the gearbox output shaft 170 is rotatably mounted in an aircraft gearbox housing 180, journaled by bearings 181a, 181b, such that the gearbox output shaft 170 can rotate about a gearbox axis B. The gearbox output shaft 170 comprises splines 174 on an inner circumferential surface thereof. The generator input shaft 160 and gearbox output shaft 170 are arranged such that the splines 164 are able to intermesh with the splines 174. This splined connection 164, 174 permits the gearbox output shaft 170 to transfer rotational drive to the generator input shaft 160. Furthermore, the splined connection 164, 174 permits axial movement of the generator input shaft 160 along rotor axis B relative to the gearbox output shaft 170. Although the figures and the description provided herein specify that the gearbox output shaft 170 and the generator input shaft 160 are connected by a splined engagement, it will be understood that any suitable means for transferring drive rotational drive while permitting relative axial movement may be employed, such as an axially moveable torque transferring interface. The splined engagement 164, 174 between the gearbox output shaft 170 and the generator input shaft 160 may be arranged in a similar manner to the splined engagement 123, 163 between the generator input shaft 160 and the disconnect input shaft 120, such that the splined engagement 164, 174 facilitates the transfer of rotational drive between the generator input shaft 160 and the gearbox output shaft 170, even in circumstances in which the generator input shaft 160 is moved axially relative to the gearbox output shaft 170 and/or the generator input shaft 160 is non-parallel to the gearbox axis B.

In FIG. 2, the gearbox axis B is shown to be offset from rotor axis A by a distance, x. Although the gearbox axis B is shown to be parallel to the rotor axis A, it will be understood that the disclosure presented herein is not limited to such an arrangement, and may equally apply to situations in which the gearbox axis B were non-parallel to the rotor axis A, instead of, or as well as, being offset from the rotor axis A. FIG. 2 illustrates a possible situation in aircraft engine assemblies in which the axis of rotation of the gearbox output shaft 170, or any other input providing rotational drive to the generator, is non-parallel to and/or offset from the axis of rotation of the rotor of the generator. As such, the input to the generator is misaligned. This may occur as a result of manufacturing tolerances. In other words, the rotor axis A may be non-parallel to, and/or offset from, the gearbox axis B.

In certain prior disconnect devices, a gearbox output shaft is connected to a generator input shaft by a splined engagement, with the input shaft being directly connected to a disconnect device, for example, such that rotational drive is transferred directly from the gearbox output shaft to the disconnect device. In these prior disconnect devices, any misalignment between the gearbox output shaft and the generator input shaft would cause the input side of the disconnect device to be non-parallel with an axis of rotation of the rotor of the generator. As such, a drive transfer means, through which rotational drive would be transferred from the disconnect input shaft to the rotor, would be required to transfer drive between two shafts that were misaligned from one another. Such misalignment causes accelerated wear of the drive transfer means. For example, for a drive transfer means comprising a set of intermeshing clutch members, misalignment therebetween would cause accelerated wear of the clutch members, leading to an increased requirement for servicing and a less reliable disconnect device. Furthermore, misalignment in the drive transfer means would make fast disconnection more difficult.

The embodiment described herein seeks to solve the problem of accelerated wear of the drive transfer means 116 by employing the generator input shaft assembly 129, comprising a separate generator input shaft 160 and disconnect input shaft 120 as described hereinabove. In the situation illustrated in FIG. 2, gearbox axis B is misaligned with rotor axis A, that is, the gearbox output shaft 170 is misaligned with the rotor 110. This misalignment causes the input axis C to be non-parallel to the rotor axis A, that is, the misalignment causes the generator input shaft 160 to rotate about an axis that is non-parallel to the rotor 110. In this illustration, the input axis C is at an angle, δ, to the rotor axis A. In FIG. 2, parts of the generator input shaft 160 may appear to impinge on surrounding parts of the gearbox output shaft 170 and the disconnect input shaft 120; this is a result of the angle δ being exaggerated for the sake of illustration. The arrangement shown allows the generator input shaft 160 to accommodate for the misalignment by it being able to rotate, and thereby transfer rotational drive, even when its input axis C is non-parallel to the rotor axis A. In particular, this is achieved by the splined engagement 164, 174 between the gearbox output shaft and the generator input shaft 160 and the splined engagement 123, 163 between the generator input shaft 160 and the disconnect input shaft 120 allowing the generator input shaft 160 to accommodate misalignment between the gearbox output shaft 170 and the rotor axis 11, to thereby reduce misalignment between the first and second disconnect members 101, 121 of the drive transfer means 116.

In addition to the generator input shaft 160 being able to rock about rotor axis A, it is further configured to float axially relative to the disconnect input shaft 120 and relative to the gearbox output shaft 120. The generator input shaft 160 may be further provided with a first flange 165, extending from the outer circumferential surface thereof, in proximity to an open end of the disconnect input shaft 120. The flange 165 provides a means to limit the movement of the generator input shaft 160 towards the drive transfer means 116, along rotor axis A. The generator input shaft 160 may further comprise a second flange 166, extending from the outer circumferential surface thereof, in proximity to an open end of the gearbox output shaft 170. The flange 166 provides a means to limit movement of the generator input shaft 160 towards the gearbox, along rotor axis A.

Figure 3:
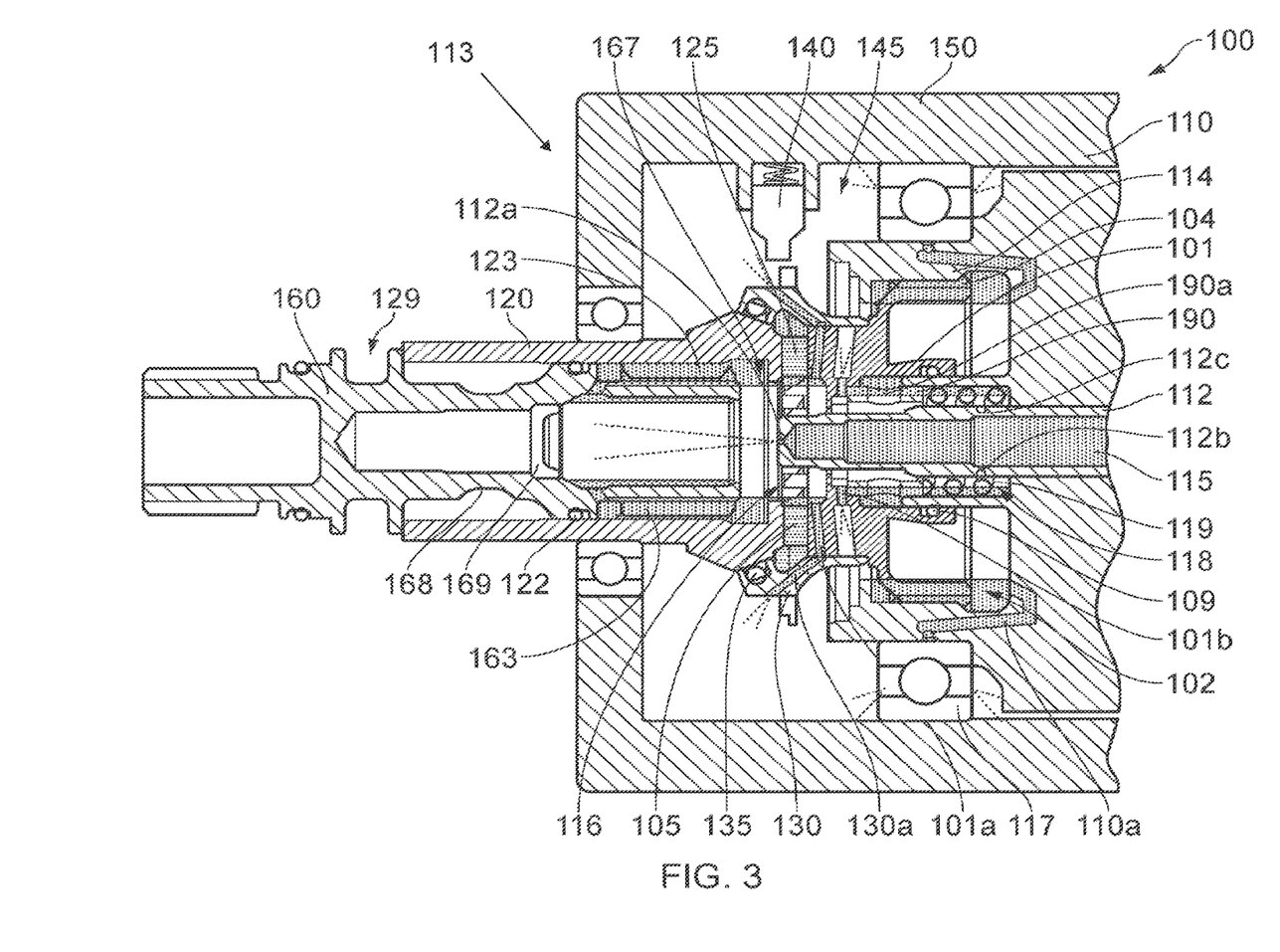
FIG. 3 is a schematic diagram illustrating the disconnect device of FIG. 1.

FIG. 3 illustrates an embodiment of the disconnect device 100 as described hereinabove with reference to FIGS. 1 and 2. In particular, FIG. 3 illustrates the flow of a lubricant fluid, such as oil, throughout the disconnect device, which provides lubrication and heat transfer, for cooling purposes, from certain components in use. In certain prior disconnect devices that lack the generator input shaft assembly 129 as described herein, there has been no need to provide a fluid circuit to such an assembly. Therefore, a fluid circuit 113 is provided herein that may be employed in an embodiment of the disconnect device 100 and the flow of a suitable cooling/lubrication fluid in use is depicted using dotted lines. Although references to oil are made herein, the skilled person will appreciate that any other suitable fluid, particularly a liquid, capable of providing the required lubrication and/or heat transfer may be suitable. The fluid circuit 113 comprises a bore 115 provided in the rotor shaft 112. The bore 115 is in fluid communication with an inlet port (not shown) provided upstream of the disconnect device, towards the rotor 110. The bore 115 is pressure regulated upstream using a pressure relief valve (not shown) and facilitates the flow of oil from the rotor 110, through the rotor shaft 112, and towards the disconnect device 100. The rotor shaft 112 comprises a first fluid port 112a and a second fluid port 112b, which may be considered to be sized attenuators to control the oil flow rate. In this way, the flow of oil is maintained and controlled even when the rotor is stationary or is disconnected from the input shaft 160.

The first fluid port 112a is provided by an axial hole through an end wall of the rotor shaft 112. The first fluid port 112a is in fluid communication with both the bore 115 and a disconnect spline chamber 167, in which the splined engagement 123, 163 is provided between the generator input shaft 160 and the disconnect input shaft 120. Therefore, the first fluid port 112a provides a flow path to allow oil to flow from the bore 115 to the disconnect spline chamber 167. The centrifugal force acting on the oil in the disconnect spline chamber 167, provided by the rotating input shaft assembly 129 in use, causes the oil to flood the splines 123, 163. In this way, the first fluid port 112a provides oil to lubricate the splines 123, 163. An O-ring 122 is provided at an interface between the disconnect input shaft 120 and the generator input shaft 160 to seal the interface and prevent leakage of oil from the disconnect spline chamber 167. The drive transfer means 116 is in fluid communication with the disconnect spline chamber 167. Therefore, oil from the disconnect spline chamber 167 can be provided to the drive transfer means 116 to thereby flood the clutch members 105, 125 with oil. In this way, the clutch members 105, 125 of the drive transfer means 116 are lubricated with oil. An O-ring 135 is provided at an interface between the ramp member 130 and the disconnect input shaft 120 to seal the interface and prevent leakage of oil from the drive transfer means. The first disconnect member 101 comprises a first fluid port 101a. The ramp member 130 comprises a fluid port 130a. The fluid ports 101a, 130a together provide a flow path between the drive transfer means 116 and the actuation chamber 145. The centrifugal force acting on the oil flooding the drive transfer means 116 forces the oil from the drive transfer means, through the fluid ports 101a and 130a, and into the actuation chamber 145. In this way, oil is provided to the disconnect actuating member 140 and to any other components in the actuation chamber 145 that may require lubrication and/or cooling, such as the ramp member 130.

The second fluid port 112b is provided by a radial hole through the circumferential wall of the rotor shaft 112. The rotor shaft 112 may also comprise an indentation 112c, positioned diametrically opposite to the second fluid port 112b, to substantially mechanically balance the effect of the removed material of the second fluid port 112b. The second fluid port 112b is in fluid communication with both the bore 115 and the annular space 118, thereby providing an oil flow path therebetween. Therefore, in use, the pressure acting on the oil forces oil out of the bore 115, through the second fluid port 112b, and into the annular space 118. In this way, the annular space 118 can be flooded with oil. An O-ring 109 is provided at an interface between the first disconnect member 101 and the rotor 110, at an outer circumferential surface of the annular space 118, to seal the interface and prevent leakage of oil. In addition to the biasing means 119, the annular space 118 further comprises a spacer 190. The spacer 190 is an annulus, disposed around the rotor shaft 112 between the first disconnect member 101 and the biasing means 119 in order to maintain the biasing means 119 in a desired axial position. The spacer 190 comprises a plurality of radial holes 190a. The spacer 190 maintains the position of the biasing means 119 around the rotor shaft 112 while allowing oil to flow within the annular space 118. The first disconnect member 101 further comprises a second fluid port 101b. The second fluid port 101b provides a flow path between the annular space 118 and a rotor spline chamber 102, in which the splined engagement 104, 114 is provided between the first disconnect member 101 and the rotor 110. The centrifugal force acting on the oil in the annular space 118 forces oil out of the annular space 118, through the second fluid port 101b, and into the rotor spline chamber 102. Therefore, the second fluid port 101b provides oil to the rotor spline chamber 102 to thereby flood the splines 104, 114 with oil. In this way, the second fluid port 101b provides oil to lubricate the splines 104, 114. Furthermore, the second fluid port 101b provides a weir to allow the annular space 118 to be flooded with oil; this ensures the contact faces of the biasing means 119 are lubricated. The rotor 110 comprises a fluid port 110a. The fluid port 110a provides a flow path between the rotor spline chamber 102 and the rotor bearing 117. The centrifugal force acting on the oil in the rotor spline chamber 102 forces oil out of the rotor spline chamber 102, through the fluid port 110a, and toward the rotor bearing 117. In this way, the fluid port 110a provides oil to lubricate the bearing 117.

Therefore, from a single feed of oil from the bore 115 of the rotor shaft 112, a number of components of the disconnect device 100 that require lubrication, including the disconnect actuating member 140, the rotor bearing 117, the splines 104, 114, 123, 163 and the clutch members 105, 125 are provided with oil accordingly. Furthermore, these components are provided with oil using two separate fluid ports 112a, 112b from the bore 115. Separating the oil circuit into a first and second branch as shown may be advantageous in that, in the event of disruption of oil flow or pressure loss in the first branch, the negative effect on the second branch will be reduced as compared to a case where a single path circuit is used. Similarly, in the event of disruption of oil flow or pressure loss in the second branch, the negative effect on the first branch will be reduced. One example of where this is can be advantageous is in the event of oil pressure loss from the branch defined by the first fluid port 112a due to, for example, rotor disconnection or failure of the rotor bearing 117; despite such an event, the drive transfer means 116 and/or the splines at the interface 123 will continue to be flooded with oil and will thereby continue to be lubricated. Therefore, the fluid circuit provided herein complements the generator input shaft assembly 129 by providing the drive transfer means with further wear and failure mode resistance, thereby lengthening its service life. Complementary to the shear neck portion 168 described hereinabove, the generator input shaft 160 optionally comprises an oil plug 169. As shown in FIG. 3, the oil plug 169 is positioned inside the generator input shaft 160 at an axial position between the shear neck portion 168 and the disconnect spline chamber 167. As such, in the event of failure of the generator input shaft 160 at the shear neck portion 168, oil in the disconnect spline chamber 167 will be prevented by the oil plug 169 from escaping.

Figure 4:
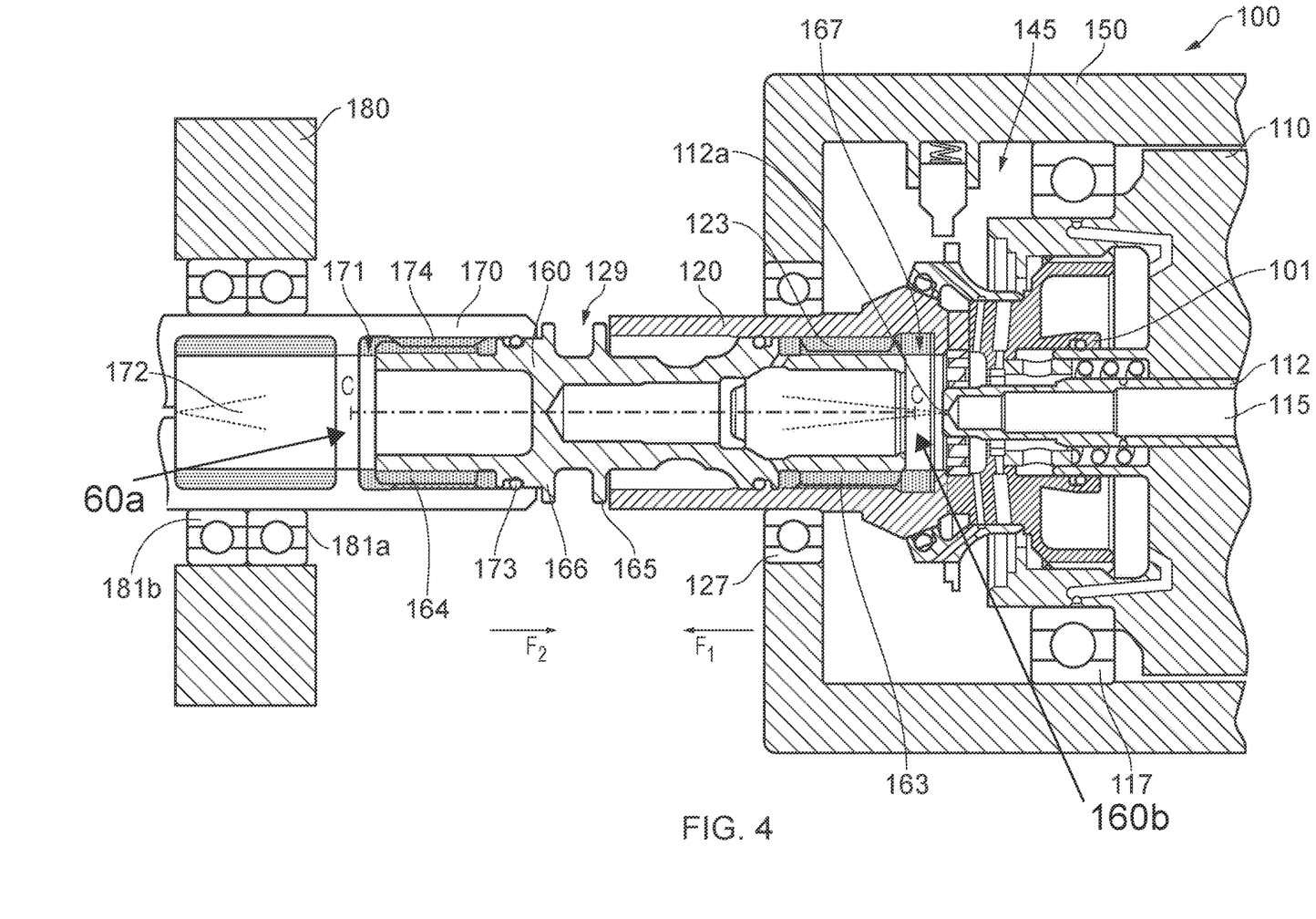
FIG. 4 is a schematic diagram illustrating the disconnect device of FIG. 1.

FIG. 4 illustrates an embodiment of the disconnect device 100 as described hereinabove with reference to FIGS. 1 to 3. In particular, FIG. 4 illustrates the presence of oil around the generator input shaft 160. The generator input shaft 160 includes a distal end 160a facing the aircraft engine and a generator end 160b facing the rotor 110. As explained above, the first fluid port 112a provides a jet of oil from the bore 115 to the disconnect spline chamber 167, and the apparent centrifugal force acting on the oil in the disconnect spline chamber 167, provided by the rotating input shaft assembly 129 in use, causes the oil to flood the splines 123, 163. As will be appreciated by the skilled person, the oil in the disconnect spline chamber 167 will have a certain pressure, P1. Furthermore, the oil in the disconnect spline chamber 167 will impinge on the generator input shaft 160 over a certain area, A1, in a direction that is towards the gearbox output shaft 170 along input axis C, that is, to the left of FIG. 4. Therefore, the oil in the disconnect spline chamber 167 will exert a force, F1, on the generator input shaft 160 in the direction of the arrow. The force F1 will be equal to the product of the pressure P1 and the area A1. As will be understood, the hydrostatic pressure of the oil used to lubricate the splines 123, 163 may produce a resultant force and an associated axial load on the generator input shaft 160. Given that the generator input shaft 160 is configured to float axially relative to the disconnect input shaft 120 and to the gearbox output shaft 170, such a resultant force would cause the generator input shaft 160 to accelerate towards the gearbox output shaft 170 until the flange 166 were brought into contact with the gearbox output shaft 170, thereby limiting any further axial movement of the generator input shaft 160. At this position, the generator input shaft 160 would continue to experience a compressive axial load due to the resultant force from the oil pressure.

In order to reduce such an axial load, the embodiment described herein advantageously provides a second force, $F_2$, able to balance the first force $F_1$. The gearbox output shaft 170, to which the disconnect device 100 may be connected to in use, may be provided with an oil circuit (not shown). The oil circuit may comprise an inlet port (not shown) in fluid communication with a bore 172 of the gearbox output shaft 170. The inlet port provides a supply of oil to the gearbox spline chamber 171, via the bore 172. The centrifugal force acting on the oil in the gearbox spline chamber 171, provided by the rotating gearbox output shaft 170 in use, causes the oil to flood the splines 164, 174. In this way, the fluid port 172 provides oil to lubricate the splines 164, 174. An O-ring 173 is provided at an interface between the gearbox output shaft 170 and the generator input shaft 160 to seal the interface and prevent leakage of oil from the gearbox spline chamber 171. Similarly to that of the disconnect spline chamber 167, the oil in the gearbox spline chamber 171 will have a certain pressure $P_2$ and will impinge on the generator input shaft 160 over a certain area, $A_2$, in a direction that is towards the disconnect input shaft 120 along input axis C, that is, to the right of FIG. 4. Therefore, the oil in the generator spline chamber 171 will exert a force, $F_2$, on the generator input shaft 160 in the direction of the arrow. The force $F_2$ will be equal to the product of the pressure $P_2$ and the area $A_2$.

The disconnect device 100 is configured such that $F_1=F_2$ so that there is no resultant force along input axis C as a result of the oil pressure on the generator input shaft 160. Therefore, the disconnect device 100 is configured such that $A_1P_1=A_2P_2$. Indeed, this condition may be satisfied even when, for example, $P_1 \neq P_2$, by choosing appropriate values for $A_1$ and/or $A_2$ accordingly. Likewise, the condition for zero resultant force may be satisfied even when $A_1 \neq A_2$, by choosing appropriate vales for $P_1$ and/or $P_2$ accordingly. Therefore, this embodiment of the disconnect device 100 advantageously provides flexibility of design while maintaining compatibility with the aircraft engines in which it may be installed.

FIG. 5 schematically illustrates an aircraft 1 comprising an aircraft engine 2 and a generator 3. The aircraft engine 2 is able to transfer drive to the generator 3 via a generator input shaft 160. The generator input shaft 160 is able to transfer drive to the rotor 110 via a disconnect device 100 as described hereinabove.

Various modifications, whether by way of addition, deletion and/or substitution, may be made to all of the above described embodiments to provide further embodiments, any and/or all of which are intended to be encompassed by the appended claims.

The invention claimed is:

1. A generator arranged to be driven by a prime mover of an aircraft, the generator comprising:
   a rotor, which is rotatable about a rotor axis;
   a disconnectable drive transfer means;
   a generator input shaft assembly comprising:
      a generator input shaft arranged to receive a drive input to the generator, wherein the generator input shaft comprises a shear neck portion defined by a portion of reduced shaft thickness; and
      a disconnect input shaft arranged to deliver a drive input from the generator input shaft to the disconnectable drive transfer means, the disconnectable drive transfer means being configured to transfer rotational drive from the generator input shaft assembly to the rotor, wherein the disconnect input shaft is rotatably mounted in a generator housing and is journaled to rotate about the rotor axis by a bearing;
   wherein the generator input shaft assembly is configured such that the generator input shaft: axially floats relative to the disconnect input shaft; and/or drive the disconnect input shaft with an axis of rotation of the generator input shaft non-parallel to an axis of rotation of the disconnect input shaft, so as to compensate for a misaligned input to the generator input shaft.

2. The generator according to claim 1, wherein the generator input shaft is configured to drive the disconnect input shaft via an axially moveable torque transferring interface.

3. The generator according to claim 2, wherein the axially moveable torque transferring interface comprises intermeshing input teeth.

4. The generator according to claim 3, wherein the intermeshing input teeth project radially with respect to the disconnect input shaft.

5. The generator according to claim 2, wherein the intermeshing input teeth comprise a first set of teeth extending from an inner circumferential surface of the disconnect input shaft, the first set of teeth being arranged to intermesh with a second set of teeth extending from an outer circumferential surface of the generator input shaft.

6. The generator according to claim 2, wherein the axially moveable torque transferring interface comprises a spline arrangement.

7. The generator according to claim 2, further comprising a fluid circuit configured to deliver a flow of fluid to the axially moveable torque transferring interface.

8. The generator according to claim 7, wherein the fluid circuit is configured to deliver a flow of fluid to the disconnectable drive transfer means.

9. The generator according to claim 8, wherein the disconnectable drive transfer means comprises a first disconnect member and a second disconnect member, and an engaging interface therebetween, and wherein the fluid circuit is configured to deliver a flow of fluid to the engaging interface.

10. The generator according to claim 9, wherein the first disconnect member is configured to transfer rotational drive to the rotor via an intermeshing rotor interface and the fluid circuit is configured to deliver a flow of fluid to the intermeshing rotor interface.

11. The generator according to claim 7, wherein the rotor is mounted in the generator housing, journaled by a rotor bearing, and the fluid circuit is configured to deliver a flow of fluid to the rotor bearing.

12. The generator according to claim 11, wherein the fluid circuit comprises a first branch, configured to deliver a flow of fluid to the axially moveable torque transferring interface between the generator input shaft and the disconnect input shaft and/or to the disconnectable drive transfer means; and wherein the fluid circuit further comprises a second branch configured to deliver a flow of fluid to the rotor bearing.

13. A system, comprising:
   the generator of claim 1; and
   an aircraft engine assembly comprising an engine assembly output shaft, the generator being arranged to be driven by the engine assembly output shaft;
   wherein the generator input shaft is configured to be able to float axially relative to the disconnect input shaft and/or to be able to drive the disconnect input shaft when an axis of rotation of the generator input shaft is non-parallel to an axis of rotation of the disconnect input shaft so as to be able to compensate for a misalignment between the engine output shaft and the disconnect input shaft of the generator.

14. The system according to claim 13, wherein the generator input shaft comprises:
   a distal end facing the aircraft engine, and
   a generator end facing the rotor; configured such that a force generated by a pressure of the fluid circuit of the generator impinging on the generator end is equal to a force generated by a pressure of an engine assembly fluid impinging on the distal end.

* * * * *